United States Patent [19]

Fourezon

[11] Patent Number: 4,680,213
[45] Date of Patent: Jul. 14, 1987

[54] TEXTILE REINFORCEMENT USED FOR MAKING LAMINATED COMPLEXES, AND NOVEL TYPE OF LAMINATE COMPRISING SUCH A REINFORCEMENT

[75] Inventor: André Fourezon, Mariac, France

[73] Assignee: Establissements les fils d'Auguste Chomarat et Cie, Paris, France

[21] Appl. No.: 844,010

[22] Filed: Mar. 25, 1986

[30] Foreign Application Priority Data

Apr. 4, 1985 [FR] France ............................... 85 05346

[51] Int. Cl.$^4$ .............................................. B32B 5/12
[52] U.S. Cl. ................................. 428/105; 428/192; 428/193; 428/225; 428/255; 428/257; 428/258; 428/259; 428/260; 428/296; 428/408; 428/902
[58] Field of Search ............... 428/288, 109, 110, 257, 428/258, 259, 228, 229, 224, 225, 296, 902, 408, 260, 255, 105, 192, 193

[56] References Cited

U.S. PATENT DOCUMENTS 4,440,819  4/1984  Rosser et al. .................. 428/110
4,454,184  6/1984  Britton .......................... 428/110
4,460,633  7/1984  Kobayashi et al. ............. 428/110
4,490,427  12/1984 Grant et al. .................... 428/110

FOREIGN PATENT DOCUMENTS 1207065  9/1970  United Kingdom .

Primary Examiner—James J. Bell
Attorney, Agent, or Firm—Parkhurst & Oliff

[57] ABSTRACT

This invention relates to a novel type of textile reinforcement adapted to be used for making laminated complexes, of the type constituted by at least one layer of reinforcing yarns. The yarns are bonded together by adhesion with binding yarns, disposed transversely, in a small proportion with respect to the reinforcing yarns.

Reinforcing yarns are spaced apart from one another so as to form stable and undeformable holes of definite shape.

Additional binding yarns are disposed on either side of each of the strips of reinforcing yarns.

9 Claims, 10 Drawing Figures

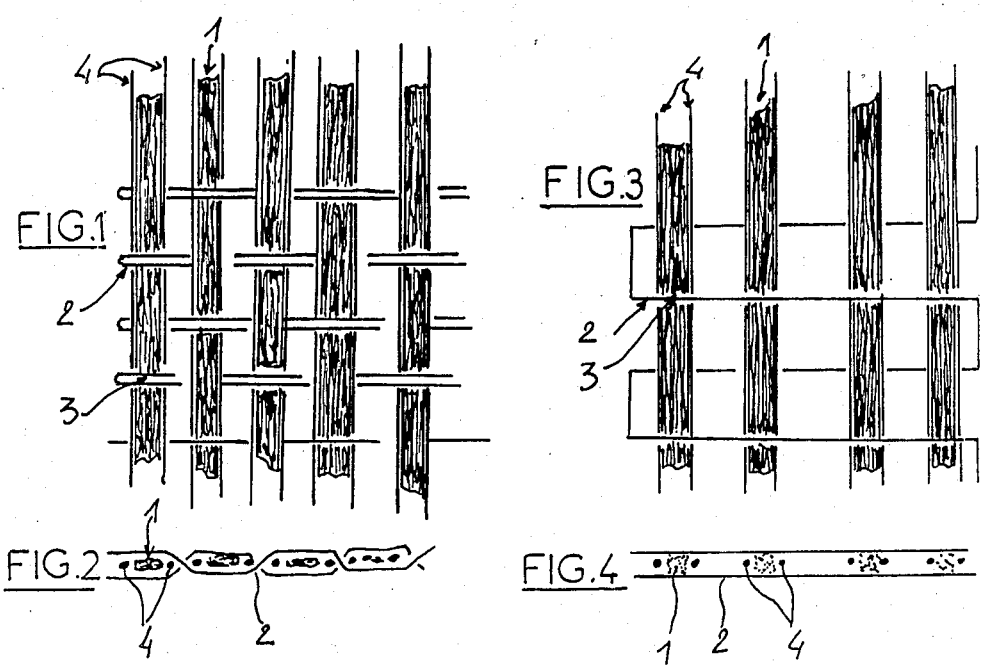

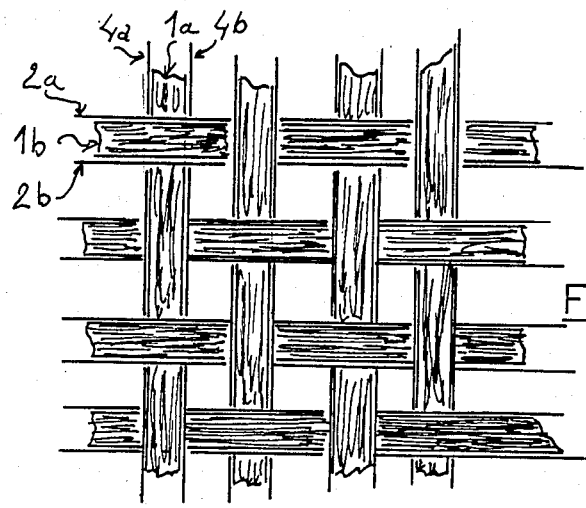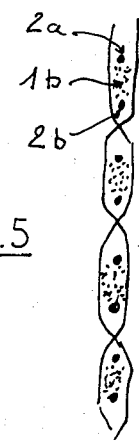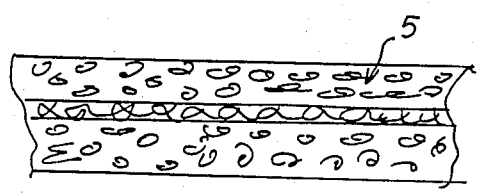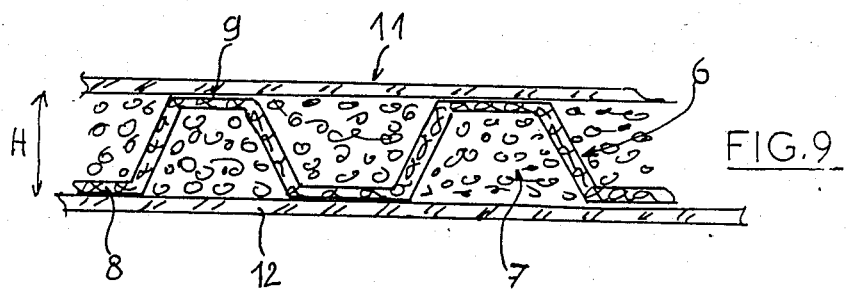

TEXTILE REINFORCEMENT USED FOR MAKING LAMINATED COMPLEXES, AND NOVEL TYPE OF LAMINATE COMPRISING SUCH A REINFORCEMENT

The present invention relates to an improvement in textile reinforcements used for making laminated complexes, i.e. articles based on resin (polyester or the like) reinforced with a textile reinforcing layer.

Very numerous types of textile layers such as fabrics, grids, non-woven fabrics or combinations of such elements have been proposed up to the present time for making laminates.

In a large number of applications, in order to obtain a good penetration of the matter in which the reinforcement is to be embedded, for example a good penetration of the resin (polyester or the like) or foam (polyurethane), it is desirable if the reinforcement is perforated. Numerous techniques known in the textile industry may be used for making such perforated reinforcements.

For example, it may be envisaged to employ weaving, but in that case it is necessary, if it is desired to obtain a stable, non-deformable structure, to use a reinforcement of the gauze type in order to obtain perfect positioning of the warp yarns with respect to the filling yarns.

It might also be envisaged to employ the technique of knitting, well known for making netting. In such a case, the presence of the stitches has for its consequence to render the article heavy and in particular to have very dense zones at the point of blockage, zones in which the resin or the like may have difficulty in penetrating.

Textile reinforcements called "grids" have also been proposed, these reinforcements being composed of layers of superposed yarns, oriented differently with respect to one another and bonded together by adhesion. Such articles of grid type may therefore have a perforated structure and make it possible to obtain reinforced materials laminated in all directions, but they present the drawback of comprising a large quantity of bonding agents which may be detrimental to the quality of the finished composite article.

Moreover, perforated felts or non-woven fabrics are also known which present the advantage of having a very good permeability during impregnation with the coating matter but present the drawback of having weak characteristics of tensile strength.

Furthermore, as disclosed in particular in French Pat. Nos. 1 167 764 and 2 214 000, textile reinforcements called "unidirectional layers" have been proposed, i.e. constituted for the majority by fibers extending either transversely or longitudinally and which are bonded together by adhesion by yarns extending transversely with respect to the reinforcing yarns proper (the binding yarns being either woven slack with the above-mentioned yarns or simply superposed thereon). Up to the present time, in such unidirectional layers, the reinforcing yarns proper are generally maintained substantially attached to one another by the binding yarns.

A novel type of perforated textile reinforcement, adapted to be used for making laminated complexes, has now been found, and this forms the subject matter of the present invention, this reinforcement being able to comprise either one series of reinforcing yarns (unidirectional reinforcement), or two series of reinforcing yarns (bidirectional reinforcement) which is not only simple to produce, presents good characteristics of permeability during impregnation, is easy to store and handle, but, in particular, presents a perfectly stabilized texture.

The invention therefore generally relates to a novel type of textile reinforcement adapted to be used for making laminates, this reinforcement being of the type constituted by at least one layer of reinforcing yarns proper, said yarns being bonded together by adhesion with binding yarns, which are very fine with respect to the reinforcing yarns, and it is characterized in that:

said reinforcing yarns are in the form of strips spaced apart from one another so as to form stable and undeformable holes of definite shape, additional binding yarns are disposed on either side of each of the strips of reinforcing yarns.

The material constituting the reinforcing yarns will be composed of any type of yarn currently used for making laminated articles, such as glass fibers, carbon fibers, aramid fibers such as those marketed under the trademark "KEVLAR", . . .

In the material, such fibers are in the form of flat strips, constituted by a plurality of parallel filaments, the width of these strips being adapted as a function of the articles to be produced but generally comprised between two and fifteen millimeters. The spacing (therefore the dimensions of the holes) will also be a function of the articles to be produced but, thanks to the invention, it is possible to obtain holes of very small dimensions, which are perfectly stable, for example having a width of one millimetre for a height of five millimetres, which was virtually impossible to obtain with the heretofore known solutions.

The binding yarns will preferably be constituted by chemical yarns, at least superficially thermofusible and thermo-sealing, these yarns being compatible with the resin to be reinforced. For example, a yarn based on copolyamide, polypropylene, polyester, . . . may be used, whose melting point is less than that of the reinforcing yarns proper. However, core-spun yarns will preferably be used, comprising a core based on a material similar to those of the reinforcing yarns (for example glass, aramid, carbon, . . .) coated with a layer of thermo-fusible material such as a layer of polyamide, polyester. In fact, in such a case, the binding yarns present the same characteristics with respect to heat treatments as the reinforcing yarns and, furthermore, after fusion of the superficial thermo-sealing layer, the core contributes to reinforcing the article.

In the material according to the invention, the reinforcing yarns may either be in the form of a unidirectional layer, i.e. constituted by parallel strips spaced apart from one another, or possibly in the form of a bidirectional layer, i.e. constituted by two series of strips together forming an angle of 90° for example. The binding yarns, which will be referred to in the following specification as "thermofusible yarns", are, in the case of a unidirectional layer, disposed transversely with respect to said layer and may either be woven with the reinforcing yarns or simply superposed thereon in the manner of a textile grid.

In the case of bidirectional articles, i.e. articles constituted by two series of reinforcing yarns forming an angle between them, these yarns may either be woven or simply superposed in the manner of a textile grid. In that case, binding is obtained by means of two series of thermofusible yarns associated with each reinforcing strip and disposed laterally on either side of each strip.

Finally, although the strips of reinforcing yarns may be regularly spaced apart from one another (for example have a space between each strip), it is also possible, in accordance with the invention, to group these strips (in two's, three's) attached to one another, the space then being made between each group of strips. Any process of weaving or the like may be used for making the material according to the invention. To make such a material, a unidirectional or bidirectional layer of reinforcing yarns will generally be formed, in known manner, by weaving or in accordance with a "grid" technique, said yarns being associated with at least one series of thermofusible yarns disposed, according to the invention, on the one hand, transversely with respect to the reinforcing yarns and, on the other hand, on either side of each strip of reinforcing yarns, and, after the complex has been made and before being wound, the article formed will be subjected to a heat treatment provoking fusion of the thermo-fusible yarns and consequently, their adhesion with the reinforcing yarns.

Such a material in the form of a layer may be directly incorporated with a resin, foam or any other matter to be reinforced. It presents the advantage of being easily impregnated, due to the perforations that it presents. In addition, as the reinforcing yarns are preferably in the form of flat rovings constituted by parallel filaments, impregnation is further facilitated.

Such a layer may possibly be pre-impregnated with resin, foam, so as to constitute an intermediate complex which is rigid or not.

In such a case, it is possible either to use the intermediate material thus produced in flat form, for example if it is desired to incorporate a reinforcement within a foam or resin or possibly to give it a configuration in relief, such as for example an omega form. In the latter case, it is possible to make multi-layered articles comprising an inner layer constituted by such a material embedded in a thickness of foam for example and, on the two outer faces, to connect outer elements, such as plates or other finishing surfaces, the bond between the two layers being promoted by the presence of the reinforcement according to the invention on the surface of the intermediate layer.

The material according to the invention is also particularly appropriate when it is desired to make shaped elements, for example tubular elements comprising a core of plastics material (PVC for example), obtained by extrusion and on the periphery of which is added an outer coating. In such a case, the material according to the invention makes it possible to improve the bond between the laminated outer layer and inner layer, being given that a mechanical catching or bridging of the PVC is produced through the orifices and the resin of the outer layers catches on the surface of the material.

The invention will be more readily understood on reading the following description with reference to the accompanying drawings, in which:

FIGS. 1 and 2 are plan and sectional views of a unidirectional material made in accordance with the invention and in which the binding yarns are woven with the reinforcing strips.

FIGS. 3 and 4 are views similar to FIGS. 1 and 2 of a material obtained by means of a non-woven grid technique.

FIGS. 5, 6 and 7 are respectively plan view and views in section along warp and weft of a bidirectional layer obtained by weaving and made according to the invention.

FIG. 8 is a schematic view of a laminated complex comprising as reinforcing element a material according to the invention.

FIG. 9 illustrates another embodiment of a laminated complex from a material according to the invention.

Figure 10:
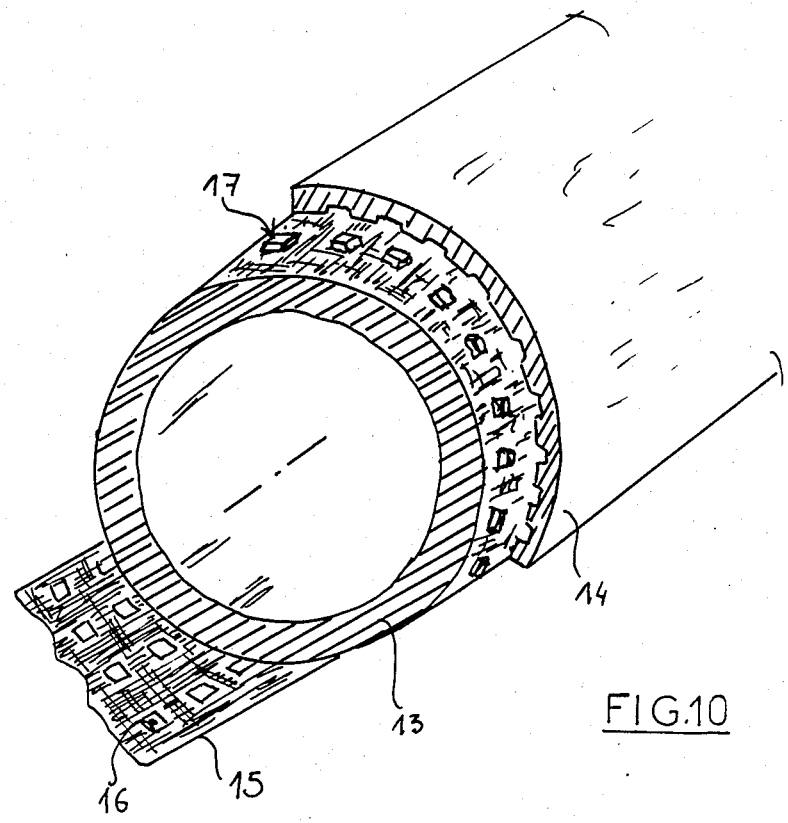
FIG. 10 illustrates a tube, in exploded perspective, made from a reinforcing element according to the invention.

Referring now to the drawings, in which the same references have been used for designating the same elements, the material according to the invention is constituted, in its most simple form, by a layer of reinforcing yarns proper 1 bonded together by binding yarns 2 disposed transversely with respect to the layer 1 and in a very small proportion with respect to the reinforcing yarns 1. The binding yarns 2 may either be woven with the reinforcing yarns 1 (FIGS. 1 and 2), or simply be superposed on these yarns, for example by making the article on a weaving loom employing the "grid" technique. In accordance with the invention, the reinforcing yarns 1 are spaced apart from one another and they are maintained in position by the binding yarns 2 by adhesion at the points of intersection 3. Such adhesion is preferably obtained by using as binding yarns 2 thermo-fusible yarns of any known type and preferably yarns of the "core/sheath" type, the core being based on a material similar to the reinforcing yarns and the sheath based on a thermo-fusible, thermo-sealing material such as polyester, polyamide.

In order to improve the positioning and holding of said reinforcing yarns 1 and to define holes of stable form, the material according to the invention comprises additional binding yarns 4 disposed on either side of each of the strips of reinforcing yarns 1. These additional binding yarns 4 are of the same nature as the transverse yarns 2.

FIGS. 5, 6 and 7 illustrate an embodiment of a bidirectional material according to the invention made by weaving. In this embodiment, the longitudinal yarns 1a and transverse yarns 1b, preferably identical, will be maintained perfectly positioned with respect to one another thanks to binding yarns 2a, 2b; 4a, 4b, disposed laterally on either side of each strip of reinforcing yarns 1.

EXAMPLE 1

A structure according to the invention, of the type illustrated in FIG. 1, is made on a conventional weaving loom.

The warp yarns 1 are constituted by glass fibers having a count of about 1200 Tex and the binding weft yarns 2 are constituted by thermo-fusible yarns based on glass fibers having a count of 70 Dtex sheathed with polyamide. Furthermore, on either side of each strip of warp yarns 1 are disposed two additional binding yarns 4 similar to the weft binding yarns 2.

Each strip of warp yarns 1 is constituted by a plurality of elementary yarns placed side by side, producing a roving with a total width of eight millimeters. The successive strips are spaced apart from one another by a distance of 0.5 millimeter.

Weaving is effected so that the binding weft yarns 2 are likewise spaced apart from one another by eight millimetres.

A woven structure is obtained in which the longitudinal yarns 1 are maintained imprisoned by the binding yarns 2. After weaving, a heat treatment at about 175° C. is effected, this provoking fusion of the polyamide sheath both of the transverse binding yarns 2 and of the additional binding yarns 4.

Such a material presents holes between the longitudinal yarns and the binding yarns 2 whose form is stable and perfectly defined, whilst, in the absence of the additional binding yarns 4, the strips of warp yarns would tend to become attached to one another.

Such a material may be used either as such or may possibly be pre-impregnated with resin, for example epoxy resin, thus enabling a perforated structure to be obtained which may for example be directly incorporated in polyurethane foam. When the material is thus impregnated with resin, it has been ascertained that, after hardening of the resin, the holes remained between the strips of warp yarns.

EXAMPLE 2

Example 1 is repeated, except that, instead of the longitudinal strips being bonded by woven transverse binding yarns 2, these transverse yarns 2 are deposited in accordance with the "grid" technique.

After heat treatment and fusion of the sheath of the thermo-fusible binding yarns, a perforated article is also obtained in which the holes have a perfectly defined shape and are very stable.

EXAMPLE 3

A textile reinforcement is produced in accordance with the invention, of the type illustrated in FIGS. 5, 6 and 7, i.e. a bidirectional reinforcement.

The warp of this reinforcement is constituted, as in the preceding Examples, by glass fibers 1a grouped together so as to obtain strips regularly spaced apart from one another by a value of 0.5 millimeter, each strip having a width of about eight millimeters. On either side of each strip 1a are placed thermo-fusible binding yarns 4a, 4b, as in the preceding Examples, likewise based on glass fibers sheathed with polyamide.

The filling is constituted by strips of glass fiber yarns 1b, similar to the warp yarns 1a. Strips 1b have a width of five millimetres and are spaced apart from one another by a value of eight millimeters. On either side of each strip 1b are disposed thermo-fusible binding yarns 2a, 2b likewise based on glass fibers sheathed with polyamide.

After weaving and heat treatment provoking fusion of the polyamide sheath of the binding yarns 2a, 2b; 4a, 4b, a perforated armature is obtained, presenting holes 0.5 millimeter wide and eight millimeters long. These holes are perfectly stable and undeformable.

As in the preceding Examples, such a material may be used either as such or may possibly be impregnated with a resin, for example epoxy resin, which, after hardening, enables a rigid, perforated plate to be obtained, used for example as reinforcement for a polyurethane foam.

With all these materials, articles are obtained which present holes of perfectly defined and stable shape. They may be used either as such or may possibly be pre-impregnated with a certain quantity of resin in order to produce a pre-impregnated material to be used subsequently. They present numerous advantages over the prior known textile structures, as they may be easily impregnated. As shown in FIG. 8, it is possible to use such a material, possibly constituted by a plurality of superposed layers, embedded within a mass of foam 5. Penetration of the foam 5, for example polyurethane, is perfect due to the holes in the material and also since the reinforcing yarns 1 are maintained virtually flat without twist between the unitary strands.

Although such a material enables simple laminated complexes as shown in FIG. 8 to be produced, it may also be shaped prior to its incorporation, for example in the form of an omega, as shown in FIG. 9.

In the present case, the pre-impregnated plate 6 based on a material according to the invention is firstly brought into the desired shape then embedded in the foam 7. If the height H of the whole is such that the respective faces 8 and 9 of the material are flush with the surface of the foam, it is possible to add on each side, plates 11, 12 or the like, likewise based on conventional laminates, the bond between the different layers thus formed being improved by the plates 11, 12 coming into contact with the textile surfaces of the material 6.

Such a material is also particularly appropriate for making shaped articles, for example tubes as illustrated in FIG. 10. This Figure schematically illustrates the production of a tube from an elementary PVC tube 13 obtained by extrusion. It is well known that such PVC tubes present poor mechanical strength. These tubes 13 must generally be associated with laminated outer layers added after extrusion. Thanks to the material according to the invention, the bond between the inner layer 13 and the outer layers 14 is clearly improved. In fact, during production of the complex, the primary PVC tube 13 is firstly surrounded by a layer 15 of a perforated material according to the invention. By heating, this material 15 is bonded to the inner tube 13, a certain quantity of matter exuding through the perforations 16 and forming protuberances 17 on the outside. It is then possible to add peripheral layers 14 in known manner, the bond between said layers 14 and the inner part 13, 15 being improved by the protuberances 17 which form anchoring points.

The foregoing Examples clearly show the advantages brought by the invention which, of course, is not limited to these embodiments. Although the material according to the invention may be used in one layer, like any reinforcing material of laminates, it may be envisaged to superpose several of these layers, possibly associating them with other fibrous layers such as for example a non-woven glass-fiber layer. Moreover, although in the preceding embodiments the reinforcing yarns 1 and binding yarns 2 have been shown in two perpendicular directions, it is obvious that said reinforcing yarns 1 may be disposed obliquely with respect to the length of the material.

What is claimed is:

1. A textile reinforcement matrix for making laminated complexes comprising:
    at least one layer of reinforcing yarns, said reinforcing yarns being arranged in a parallel relationship in said at least one layer to form strips, said strips having first and second edges and being spaced apart from one another;
    at least one layer of first binding yarns disposed transversely across said at least one layer of reinforcing yarns, and being present in a lesser amount than said reinforcing yarns; and
    at least one second binding yarn disposed in a parallel relationship with said strips of reinforcing yarns, said at least one second binding yarn being positioned along said first and second edges of each of said strips of reinforcing yarns, said at least one layer of first binding yarns and said at least one second binding yarn defining stable and non-deformable holes having a definite shape.

2. The textile reinforcement matrix of claim 1, wherein said at least one layer of first transverse binding yarns are woven with said strips of reinforcing yarns.

3. The textile reinforcement matrix of claim 1, wherein said at least one layer of first transverse binding yarns are superposed on said strips of reinforcing yarns.

4. The textile reinforcement matrix of claim 2, wherein said matrix is impregnated with resin before being used for making a laminate proper.

5. The textile reinforcement matrix of claim 4, wherein said matrix is shaped prior to being incorporated into the matter to be reinforced.

6. The textile reinforcement matrix of claim 3, wherein said matrix is impregnated with resin before being used for making a laminate proper.

7. A textile reinforcement matrix for making laminated complexes comprising:
   at least one first layer of first reinforcing yarns, said first reinforcing yarns being arranged in a parallel relationship in said at least one first layer to form first strips, said first strips having first and second edges and being spaced apart from one another;
   at least one second layer of second reinforcing yarns, said second reinforcing yarns being arranged in a parallel relationship in said at least one second layer to form second strips, said second strips having first and second edges and being spaced apart from one another;
   at least one binding yarn disposed in a parallel relationship with said first and second strips of reinforcing yarns, said at least one binding yarn being positioned along said first and second edges of each of said first and second strips of reinforcing yarns;
   said first and second strips being disposed at an angle to one another to define stable and non-deformable holes having a definite shape.

8. The textile reinforcement matrix of claim 7, wherein said strips of reinforcing yarns are woven.

9. The textile reinforcement matrix of claim 7, wherein said strips of reinforcing yarns are superposed at an angle to one another.

* * * * *